June 25, 1968      G. C. WOOD      3,389,544
SIDE DELIVERY RAKE ASSEMBLY KIT
Filed March 29, 1967      3 Sheets-Sheet 1
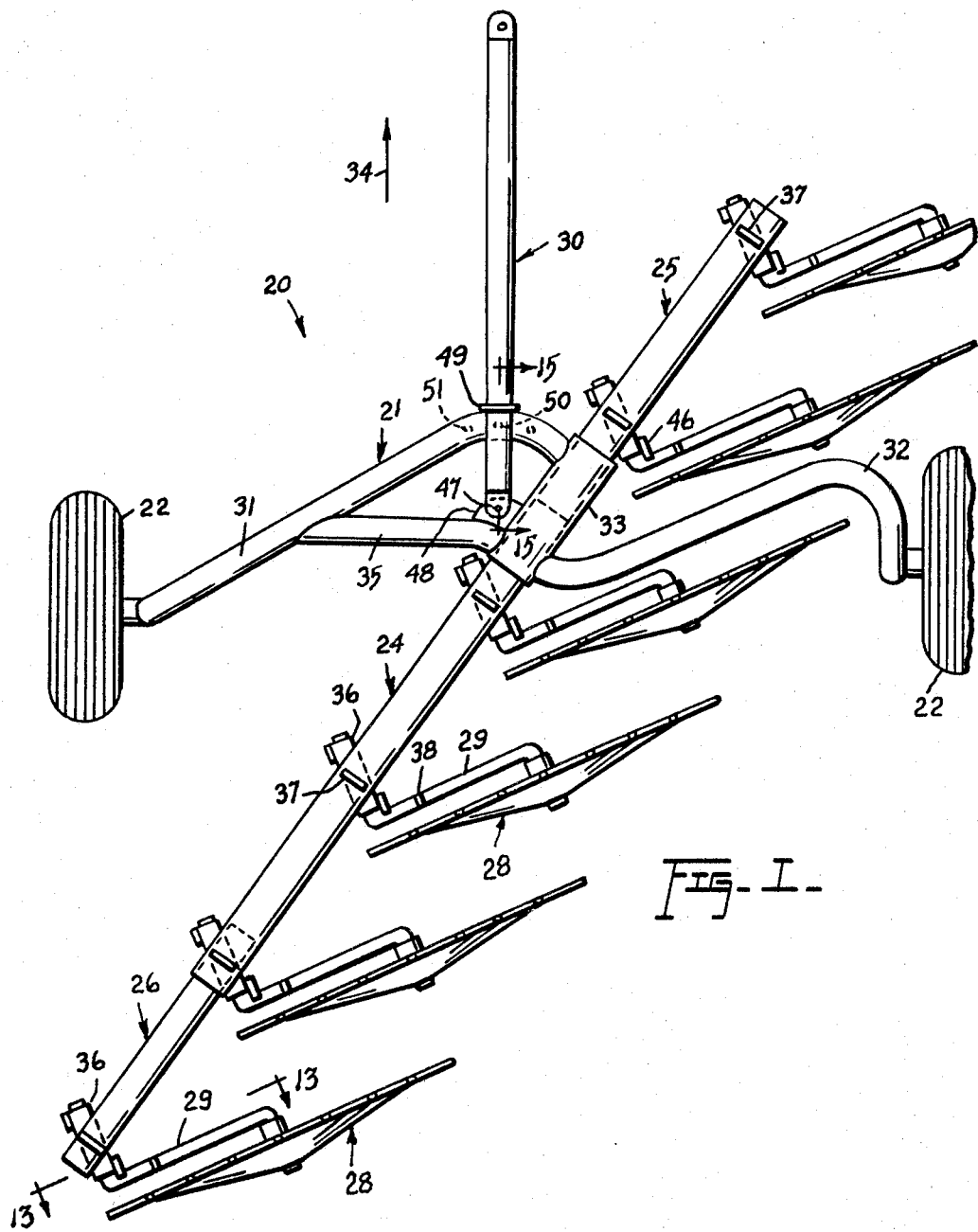
Fig. I.
INVENTOR
George C. Wood
BY Munson H. Lane
ATTORNEY June 25, 1968
G. C. WOOD
3,389,544
SIDE DELIVERY RAKE ASSEMBLY KIT
Filed March 29, 1967
3 Sheets-Sheet 2
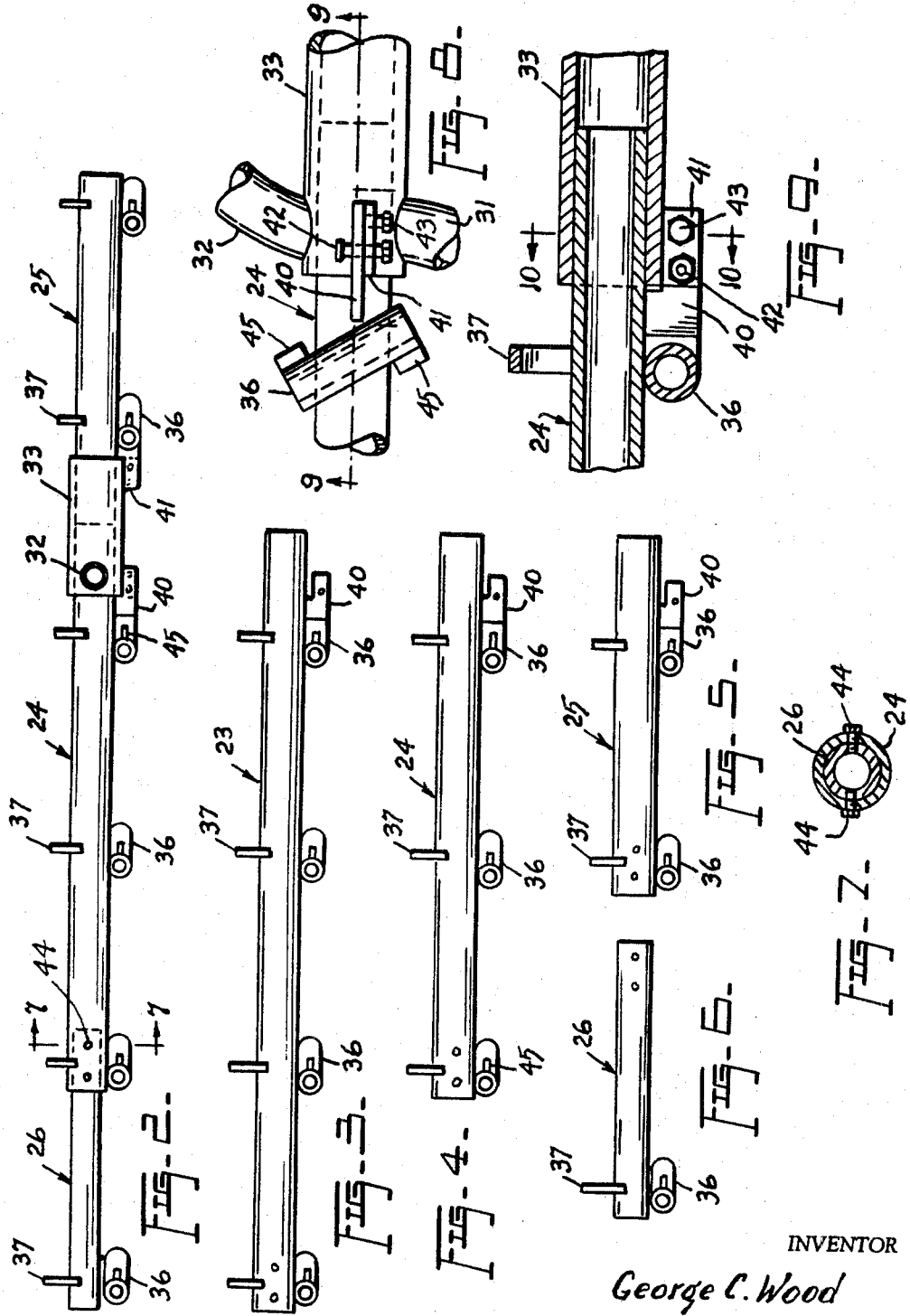
INVENTOR
George C. Wood
BY
Munson H. Lane
ATTORNEY June 25, 1968  G. C. WOOD  3,389,544
SIDE DELIVERY RAKE ASSEMBLY KIT
Filed March 29, 1967  3 Sheets-Sheet 3
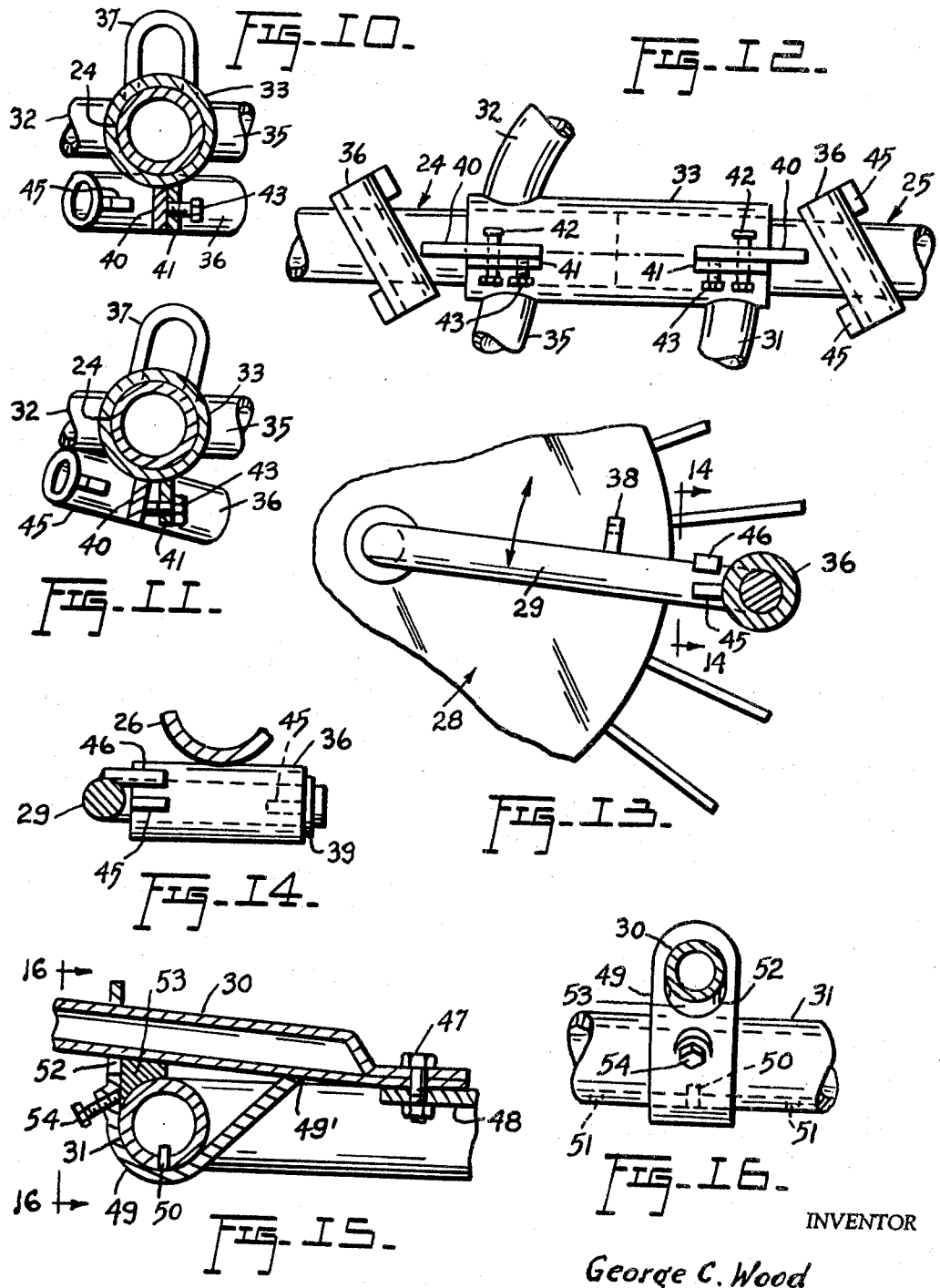
INVENTOR
George C. Wood
BY Munson H. Lane
ATTORNEY

United States Patent Office 3,389,544
Patented June 25, 1968

3,389,544
SIDE DELIVERY RAKE ASSEMBLY KIT
George C. Wood, % Darf Corporation,
Edenton, N.C. 27932
Filed Mar. 29, 1967, Ser. No. 626,853
10 Claims. (Cl. 56—377)

ABSTRACT OF THE DISCLOSURE

In a rotary side delivery rake assembly, the combination of a chassis having traveling wheels and including a horizontal socket disposed obliquely to the direction of rake travel, said socket having front and rear ends, a plurality of selectively usable tubular frame sections received rotatably and selectively in the front and rear ends of said socket in axial alignment therewith, and a plurality of raking wheels mounted on each of said frame sections.

---

This application is an improvement on my copending application Serial No. 461,861, filed June 7, 1965.

The aforementioned application discloses a rotary side delivery rake of the general type having a frame equipped with traveling wheels, a portion of the frame being disposed obliquely to the direction of travel and carrying a plurality of rotatable raking wheels which are mounted for raising and lowering movement so as to compensate for irregularities of the ground. Rakes of this general type are also disclosed in my prior Patent No. 3,146,571 dated Sept. 1, 1964, and Patent No. 3,167,900 dated Feb. 2, 1965.

My application Ser. No. 461,861 embodies certain improvements over the construction disclosed in my aforementioned patents, one of such improvements being a separation of the rake frame into what may be called a chassis member equipped with the traveling wheels, and a rake frame proper which carries the raking wheels, the two units being separably connected together so that a rake frame of certain characteristics may be interchangeably applied to a given chassis member, or vice versa.

The principal object of the present invention is to further improve upon the rake frame structure by composing the same from a plurality of selectively usable components, such components or sections being of different lengths and adapted to carry different numbers of raking wheels, so that by a selective combination of the frame sections the assembled rake may have a greater or a lesser number of raking wheels, as desired.

Thus, the present invention provides a rake assembly kit, the components of which, in addition to the selectively usable frame sections, also include a chassis and an adjustable draw bar.

Another important object of the invention is to provide improved means whereby the raking wheels may be cambered or tilted from a normally vertical plane of rotation, as operating conditions may dictate, such means reacting between the frame sections and the chassis to which they are attached.

Another object of the invention is to provide improved means for limiting lowering movement of the raking wheels relative to the frame, so that the frame with the raking wheels may be bodily raised off the ground for purposes of transportation, or the like.

With the foregoing more important objects and features in view and such other objects and features as may become apparent as this specification proceeds, the invention will be understood from the following description taken in conjunction with the accompanying drawings, wherein like reference characters are used to designate like parts, and wherein:

FIGURE 1 is a plan view showing one rake assembly such as may be constructed from components of the kit of the invention;

FIGURE 2 is a side elevational view of the rake frame shown in FIG. 1;

FIGURES 3, 4, 5 and 6 are side elevational views of different frame sections;

FIGURE 7 is a cross-sectional detail, taken substantially in the plane of the line 7—7 in FIG. 2;

FIGURE 8 is a fragmentary underside view showing the means reacting between the chassis and one of the frame sections for adjusting the plane of rotation of the raking wheels;

FIGURE 9 is a fragmentary longitudinal sectional detail, taken substantially in the plane of the line 9—9 in FIG. 8;

FIGURE 10 is a fragmentary cross-sectional view, taken substantially in the plane of the line 10—10 in FIG. 9;

FIGURE 11 is a view, similar to that in FIG. 10, but showing the parts in a differently adjusted position;

FIGURE 12 is a fragmentary underside view, similar to that in FIG. 8 but illustrating frame sections both forwardly and rearwardly of the chassis;

FIGURE 13 is an enlarged, fragmentary vertical sectional view taken substantially in the plane of the line 13—13 in FIG. 1;

FIGURE 14 is a fragmentary sectional detail, taken substantially in the plane of the line 14—14 in FIG. 13;

FIGURE 15 is an enlarged, fragmentary vertical sectional view, taken substantially in the plane of the line 15—15 in FIG. 1; and FIGURE 16 is a fragmentary sectional detail, taken substantially in the plane of the line 16—16 in FIG. 15.

Referring now to the accompanying drawings in detail, the general reference numeral 20 in FIG. 1 designates one rake assembly such as may be constructed from components of the kit of the invention.

The principal components of the rake assembly kit, hereinafter described in detail, may be generally identified as follows: a chassis 21 equipped with traveling wheels 22; a plurality of frame sections 23, 24, 25, 26 shown in FIGS. 3, 4, 5, 6 respectively; a set of raking wheels 28 each equipped with a supporting arm 29; and a draw bar 30.

The chassis 21 comprises a pair of curved members 31, 32 which are welded or otherwise secured to opposite end portions at the opposite sides of a horizontal, tubular and open-ended socket 33. The outer ends of the members 31, 32 are equipped with the traveling wheels 22 and the socket 33 is disposed obliquely to the direction of travel of the rake, as indicated by the arrow 34. A brace member 35 extends from an intermediate portion of the member 31 to the socket 33, as shown.

Each of the frame sections 23, 24 and 25 consists of an open-ended tube having a plurality of tubular bearings 36 welded to the underside thereof at longitudinally spaced points, these bearings extending obliquely to the axis of the tube and being adapted to rotatably receive angulated end portions of the aforementioned arms 29 which support the ranking wheels 28. It will be noted that although the bearings 36 are oblique relative to the tube axis, they are parallel to one another. The frame sections 23, 24 and 25 are of the same diameter but of different lengths and are provided with different numbers of the bearings 36 to accommodate different numbers of raking wheels. Thus, as exemplified, the frame section 23 is relatively long and equipped with four of the bearings 36. The section 24 is shorter with three bearings, and the section 25 is shorter still, with only two bearings. The frame section 26 is similar in construction to the sections 23, 24, 25, but is of a smaller diameter so that one end portion thereof may be telescopically fitted into an end portion of any one of the sections 23, 24, 25. The other end portion of the section 26 is provided with a single bearing 36.

Inverted U-shaped guides 37 are welded at longitudinally spaced points to the tops of the sections 23, 24, 25, 26 to slidably receive an actuating rod (not shown) by which the raking wheels 28 may be raised or lowered relative to the rake frame, suitable springs (also not shown) being connected to the actuating rod and to lugs 38 on the wheel supporting arms 29 so that the raking wheels are raised or lowered by sliding movement of the rod in the guides 37, substantially as disclosed in my aforementioned application Ser. No. 461,861.

In the assembly of the rake frame as illustrated in FIG. 1, the forward end portion of the frame section 24 has been inserted into the rear end portion of the chassis socket 33, and the rear end portion of the frame section 25 has been inserted in the front end portion of the socket, into abutment with the section 24. Thus, the section 24 extends rearwardly from the chassis and the section 25 extends forwardly. In addition, the frame section 26 has been telescoped into the rear end portion of the section 24, and the assembled frame is thus capable of supporting six of the raking wheels 28, two forwardly and four rearwardly of the chassis 21.

Manifestedly, various alternative combinations of frame sections are possible. For example, in a six wheel rake, the frame section 23 may be used in place of the sections 24 and 26. In a five wheel rake, the section 26 may be omitted and the section 24 used alone rearwardly of the chassis. In a seven wheel rake, the section 26 may be added to the section 23 at the rear of the chassis. As a practical matter, it may not be desirable to provide more than two raking wheels forwardly of the chassis, but if so desired, the section 24 could be substituted for the section 25 at the front, and the section 23 used at the rear, thus also providing a seven wheel rake, or an eight wheel rake, if the section 26 were added to the section 23. From these examples it is believed that the versatility of assembly by selective utilization of the various frame sections will be readily recognized, so that a description of all the possible arrangements is not necessary.

However, it should be noted that the dimensional proportioning and arrangement of parts in all instances is such that when the raking wheels 28 are installed in position on the rake frame, they are mutually parallel and spaced at substantially equal distances one behind another. Also, it will be apparent that the mounting of the bearings 36 at the underside of the several frame sections 23, 24, 25, 26 is such that all the bearings are oriented in the same, parallel direction, regardless of whether the frame sections are positioned forwardly or rearwardly of the chassis socket 33. In other words, any one of the frame section 23, 24, 25 may be applied either forwardly or rearwardly to the socket 33 and the associated bearings 36 will be oriented in the same direction, as shown in FIG. 1. Of course, it will be understood that the angulated journal portions of the raking wheel supporting arms 29 which are inserted in the bearings 36 are removably positioned in the bearings, being retained therein by suitable keeper washers, or the like, as indicated at 39 in FIG. 14. This permits the arms 29 to be applied to the bearings 36 in either direction, that is, from either end of the bearings, so that when the frame sections 23, 24, 25 are selectively connected to the chassis socket 33, all the raking wheels are disposed at the same (downdraft) side of the assembled frame, as illustrated in FIG. 1.

Means are provided for positively connecting the frame sections 23, 24, 25, as the situation may require, to the chassis socket 33, so as to prevent unintentional withdrawal or separation of the frame sections from the socket. These means comprise an attachment plate 40 which is welded longitudinally centrally to the underside of that end portion of each frame section which is receivable in the socket, as will be apparent from FIGS. 3–5, 8 and 10–12. The plate 40 is cut away as shown so that when the associated frame section is inserted in the socket 33, a portion of the plate extends to overlap the exterior of the socket and becomes juxtaposed to one of a pair of similar attachment plates 41 welded to the underside of the opposite end portions of the chassis socket 33. The plates 41 are offset from the longitudinal axis of the socket 33 by a distance corresponding to one-half the thickness of the plates 40 carried by the frame sections, the arrangement being such, as will be apparent from FIG. 12, that when the frame sections are inserted in either the front or the rear end of the socket 33, the plates 40 are juxtaposed to the plates 41 and the plates 41 are located at the same side of the plates 40. Suitable removable fastener elements 42 extend through aligned apertures provided in the plates 40, 41, and in this respect the fasteners 42 prevent undesired outward sliding or separation of the frame members from the chassis socket. In addition, adjusting screws 43 are screw-threaded through the plates 41 to engage the plates 40, this providing adjustment means whereby the plates 41 may be forced away from the plates 40, thus causing the frame members 23, 24, 25, as the situation may be, to rotate within the chassis socket 33, to correspondingly tilt the bearings 36 and the plane of rotation of the associated raking wheels 28, as will be clear from a comparison of FIGS. 10 and 11, so that the raking wheels may be titled or cambered rearwardly from their normal, vertical plane of rotation when so desired. In this respect it is significant to note that the frame section or sections forwardly of the chassis socket may be tilted or cambered independently of the section or sections rearwardly of the socket, so that the raking wheels at the front and rear of the chassis do not necessarily rotate in a common plane, or common parallel planes.

A word may be added concerning the connection of the frame section 26 to the sections 23, 24, 25, as the case may be, which connection, as already stated, is of a telescopic nature. In order to avoid machining of parts, the outside diameter of the section 26 may not necessarily fit the inside diameter of the sections 23, 24 or 25 with accuracy, but as shown in FIG. 7, opposing screws 44 are passed through apertures in opposite sides of the sections 23, 24 or 25 and are threaded into opposite sides of the section 26. When the screws 44 are tightened, the section 26 is expanded somewhat against the inside of the outer section and the two sections are firmly held in assembled relation.

Means are provided for limiting lowering movement of the raking wheels 28 relative to the frame, so that the frame with the wheels may be bodily picked up for purposes of transportation, or the like. These means comprise a pair of abutment lugs 45 which are welded to opposite sides of opposite end portions of the bearings 36, while a similar lug 46 is secured to the supporting arm 29 of each raking wheel, as shown in detail in FIGS. 13 and 14. When a raking wheel is lowered relative to the frame, the lug 46 on the arm 29 comes into abutment with the adjacent one of the lugs 45 on the bearing 36 and further downward movement of the wheel is not possible. The two lugs 45 are provided at the opposite sides and opposite ends of each bearing so that one of these lugs may be engaged by the lug 46 regardless of in which direction the journal portion of the arm 29 is inserted into the bearing, as already mentioned.

FIGS. 15 and 16 detail the attachment of the draw bar 30 to the chassis 21. The draw bar passes above the chassis member 31 and has a flat rear end portion connected by a pivot element 47 to a draw bar plate 48 welded to the socket 33 and brace member 35, as will be apparent from FIG. 1. The draw bar 30 passes through an aperture in a strap 49 which extends downwardly under the chassis member 31 and is welded to the underside of the draw bar as at 49'. The strap 49 carries a pin 50 which projects upwardly and is received selectively in apertures 51 formed in the underside of the member 31 equidistantly from the pivot 47. The strap aperture or opening 52 through which the draw bar passes is vertically elongated and the strap 49 is flexible sufficiently so that it may be pressed downwardly to withdraw the pin 50 from the apertures 51 and thus permit lateral adjustment of the draw bar relative to the chassis. However, a wedge 53, having a curved surface complemental to the member 31 and another curved surface complemental to the draw bar, is loosely interposed between these parts at the inside of the strap 49, and a set screw 54 is provided in the strap to engage the wedge. When the screw 54 is tightened, the wedge is firmly pressed against the member 31 and the draw bar, thus retaining the pin 50 in a locked position in one of the apertures 51.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a rotary side delivery rake assembly, the combination of a chassis having traveling wheels and including a horizontal socket disposed obliquely to the direction of rake travel, said socket having front and rear ends, a plurality of selectively usable tubular frame sections received rotatably and selectively in the front and rear ends of said socket in axial alignment therewith, and a plurality of raking wheels mounted on each of said frame sections.

2. The device as defined in claim 1 wherein the number of raking wheels on one of said frame sections is different from that on another frame section.

3. The device as defined in claim 1 together with an additional frame section telescopically connected to an end of one of the first mentioned frame sections remote from said socket, and an additional raking wheel mounted on said additional frame section.

4. The device as defined in claim 1 together with a laterally adjustable draw bar connected to said chassis, and means for releasably locking said draw bar in an adjusted position.

5. The device as defined in claim 1 together with a plurality of tubular bearings secured obliquely to each of said frame sections, a plurality of arms mounted in said bearings for raising and lowering movement, said raking wheels being carried by said arms, and means provided on said arms and on said bearings for limiting the extent of lowering movement of the arms.

6. In a rotary side delivery rake assembly, the combination of a chassis having traveling wheels and including a horizontal socket disposed obliquely to the direction of rake travel, said socket having front and rear ends, a plurality of selectively usable frame sections received selectively in the front and rear ends of said socket, a plurality of raking wheels mounted on each of said frame sections, and means for rotatably adjusting said frame sections in said socket, whereby to adjust the plane of rotation of said raking wheels.

7. In a rotary side delivery rake assembly, the combination of a chassis having traveling wheels and including a horizontal socket disposed obliquely to the direction of rake travel, said socket having front and rear ends, a plurality of selectively usable frame sections received selectively in the front and rear ends of said socket, a plurality of raking wheels mounted on each of said frame sections, and a plurality of tubular bearings secured obliquely to each of said frame sections, a plurality of arms mounted in said bearings for raising and lowering movement, said raking wheels being carried by said arms, and means provided on said arms and on said bearings for limiting the extent of lowering movement of the arms, said arms being removably receivable in said bearings selectively through opposite ends of the bearings, said limiting means comprising a pair of abutment lugs provided at opposite sides of opposite end portions of each bearing, and a further abutment lug provided on each of said arms, the lug on each arm being selectively engageable with the lugs on the associated bearing depending upon the direction of insertion of the arm into the bearing.

8. In a rotary side delivery rake assembly, the combination of a chassis having traveling wheels and including a horizontal socket disposed obliquely to the direction of rake travel, said socket having front and rear ends, a plurality of selectively usable frame sections received selectively in the front and rear ends of said socket, and a plurality of raking wheels mounted on each of said frame sections, said chassis socket and said frame sections being tubular and slidably telescoped, said frame sections being axially rotatable relative to said socket whereby to adjust the plane of rotation of said raking wheels, and means for retaining the frame sections in an adjusted position.

9. The device as defined in claim 8 wherein said retaining means comprise a pair of plates secured to opposite end portions of said socket, an additional plate secured to each frame section, the frame section plates being juxtaposed to the socket plates when the frame sections are assembled to the socket, and adjustable screws reacting between the juxtaposed plates.

10. The device as defined in claim 9 together with removable fasteners extending through said juxtaposed plates whereby to prevent separation of said frame sections from said socket.

References Cited

UNITED STATES PATENTS 2,988,865  6/1961  Van Der Lely _____ 56—377

FOREIGN PATENTS 1,203,119  7/1959  France.
1,285,900  1/1962  France.
822,178  10/1959  Great Britain.

ABRAHAM G. STONE, *Primary Examiner.*

P. A. RAZZANO, *Assistant Examiner.*